July 20, 1926. 1,593,523

P. WRIGHT

SNOW REMOVER

Filed Feb. 12, 1926 2 Sheets-Sheet 1

WITNESSES

INVENTOR
Paul Wright.
BY
ATTORNEYS

July 20, 1926.

P. WRIGHT

SNOW REMOVER

Filed Feb. 12, 1926

INVENTOR
Paul Wright

Patented July 20, 1926.

1,593,523

UNITED STATES PATENT OFFICE.

PAUL WRIGHT, OF MEDFORD, OREGON.

SNOW REMOVER.

Application filed February 12, 1926. Serial No. 87,906.

The present invention relates to a snow removal apparatus which is capable of handling practically any kind of heavy wet snow, or fine dry snow, but which is peculiarly suited for breaking up and removing hard crusted snow or snow which has been stored in piles and which become firmly packed while awaiting removal.

More specifically the device is in the nature of an attachment for trucks, tractors, or the like, and includes a pair of ribbed, oppositely revolving cylinders which break up the hard packed snow and carry it to a fan chamber, from which the snow is impelled either into a suitable receptacle such as a truck, or carried off to the side of the road.

An object of the invention is to provide a device of this character which will be efficient in action, and which may be conveniently controlled by the driver of a truck or other vehicle upon which the apparatus is carried.

Further objects of the invention are to provide snow removal apparatus of simple, practical construction, which will be rugged and durable in use, and which may be manufactured, applied and operated with comparative economy.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 3 is a front elevation thereof.

Figure 1:
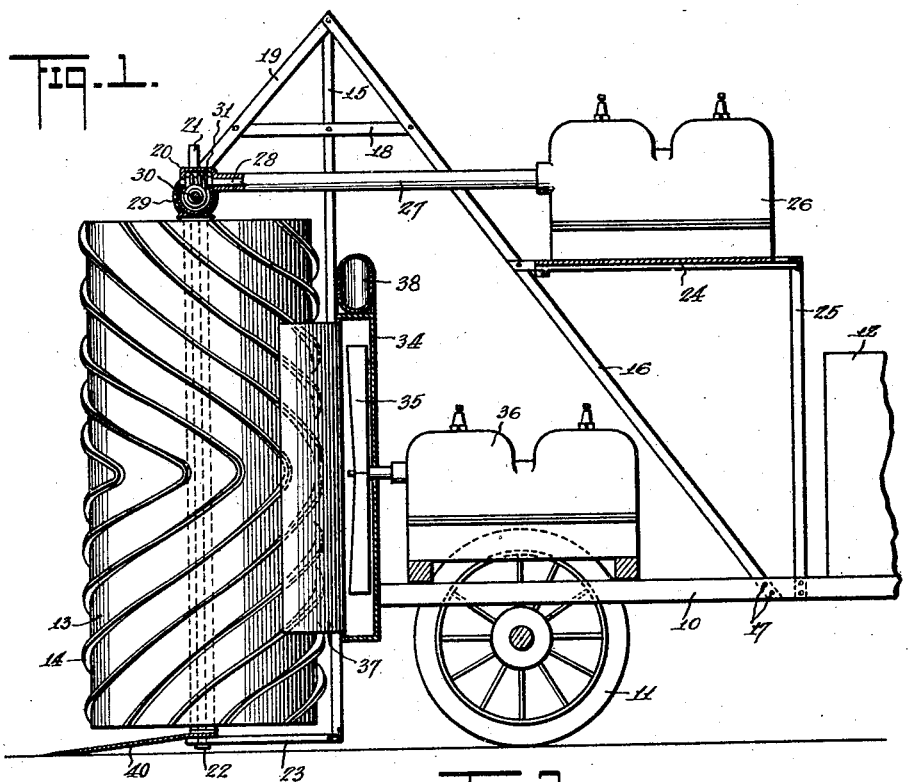
Fig. 1 is a view partly in section, but mainly in side elevation illustrating the forward end of a truck or other motor vehicle and showing the device of the present invention mounted thereon.

In the drawings I have used the reference character 10 to designate the main chassis frame of a vehicle including traction wheels 11. This vehicle may be driven from an engine (not shown) located under a hood 12, or may if desired be operated from one of the additional motors which will be later described.

Mounted forwardly of the vehicle are a pair of drums or cylinders 13 disposed with their axes in a vertical plane and rotating in opposite directions. The drums are spaced slightly apart for the passage of snow which is picked up by the ribs or cleats 14 on the exterior of the drums. It will be noted that the cleats 14 are arranged in a spiral series, and their direction of curvature is reversed at approximately the center of the drum. Thus the cleats run spirally in one direction about each drum through the lower portion thereof, and spirally in a reverse direction about the drum at the upper half thereof. This arrangement of cleats provides in effect, a series of V-shaped cleats with their apices at approximately the center of the drums, and their legs terminating at the upper and lower edges of the drum. Thus in normal operation when the two drums are moved into a snow bank or snow pile, the tendency of the cleat arrangement will be to carry the snow between the drums and force it toward the center of the drums, as will be readily understood.

The manner of mounting and driving the drums is subject to a wide variety of variations, and as a matter of fact, the drum mounting has been shown rather diagrammatically. A pair of upright frame bars 15 secured to the forward end of the chassis 10 are secured to the upper ends of diagonal bracing members 16, the lower ends of which are riveted, hinged or otherwise secured to the chassis at 17. Cross arms 18 mounted on the vertical frame bars 15 below the upper ends of the latter, have their ends bolted respectively to the frame bars 16 and to inclined frame bars 19 disposed forwardly of standards 15, and carrying at their forward ends a transverse bearing plate 20. The upper ends of frame bars 19 are secured to the upper ends of the standards 15.

The two drums 13 are formed with upper hubs or spindles 21 having bearings in the plate 20, and with lower hubs or spindles 22 having bearings in arms 23 projecting forwardly from the lower ends of the standards 15.

Mounted upon a platform or frame 24 which is supported by the braces 16 and by standards 25, is a prime mover such as a gasolene engine 26. Projecting forwardly from the engine 26 is a hollow arm 27 which provides a bearing for a power shaft 28. The hollow arm 27 is preferably rigid with a transverse housing 29 extending above the two drums, and mounting a power transmitting shaft 30 which has a worm and gear connection at 31 with the shaft 28.

Figure 2:
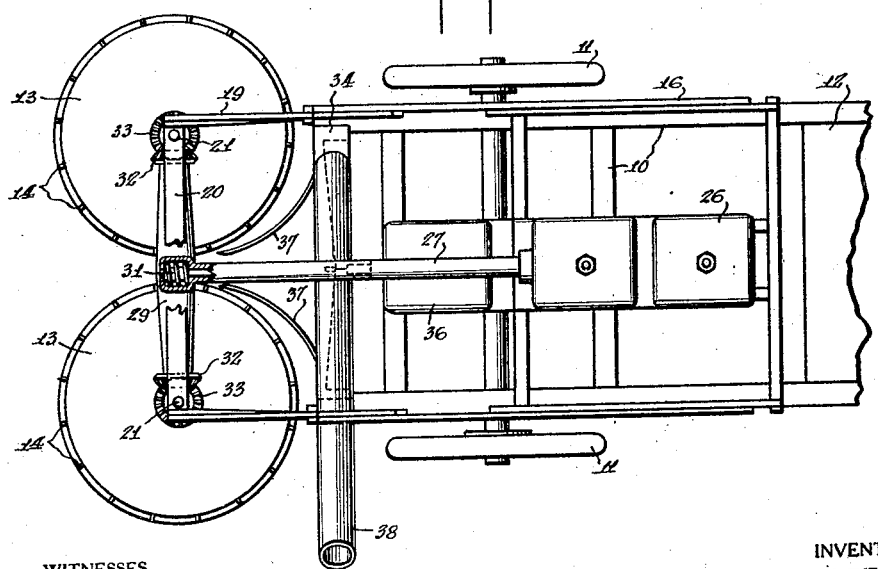
Fig. 2 is a top plan view of Fig. 1.

The ends of the shaft 30 carry bevelled pinions 32, meshing with bevelled pinions 33 keyed to the axles 21 of the drums to effect simultaneous rotation of the drums in opposite directions as indicated by the arrows in Fig. 2.

Disposed immediately behind the drums and mounted in any appropriate manner on the forward end of the chassis 10 is a fan casing 34 housing a fan 35 driven from a suitable motor 36 supported on the chassis. Curved blades 37 carried by the fan casing and projecting forwardly into the space between the drums, guide the snow which is delivered by the drums into the fan casing, from whence the fan throws it outwardly through a discharge pipe 38 either to the side of the road, or into a wagon or truck which may be provided for its reception. It will be noted that the forward ends of the blades 37 terminate closely adjacent the outer surfaces of the revolving drums 13, so that the blades 37 serve as cutters to remove excess snow from the surface of the drums and cause the snow to be drawn into the fan casing by the fan 35.

Carried by the arms 23 is a scraper plate or plough 40 which serves as an inclined delivery platform up which the snow is carried as the snow removing apparatus is moved into a snow bank or snow pile.

In many instances it may be desirable to tooth alternate cleats to attain a more positive biting action and breaking action when removing a pile of hardened snow. From the foregoing description it is believed that the operation of the device will be evident. The truck is moved forwardly carrying the cylinders into a snow bank or snow pile. The snow is broken up by the cleats on the drums and fed into the fan chamber from whence it is discharged through the lateral discharge pipe 38.

Obviously the particular manner of supporting the drums on the forward end of the truck, and the manner of rotating the drums is subject to a wide variety of variations. Obviously also the drums and the fan might be driven from the usual truck motor in any convenient manner, thereby avoiding the use of the additional motors 26 and 36.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claim

I claim:

A snow removing apparatus adapted to be mounted on the forward end of an automotive vehicle, including a pair of oppositely revolving cylinders externally spirally ribbed to deliver snow between them, a fan behind the cylinders and a laterally disposed discharge pipe through which the snow delivered to the fan is blown, and means for guiding the snow from the cylinders to the fan, including a pair of guide and scraper plates, the forward ends of which terminate closely adjacent the walls of the cylinders.

PAUL WRIGHT.